(12) United States Patent
Hossen et al.

(10) Patent No.: US 12,550,915 B2
(45) Date of Patent: Feb. 17, 2026

(54) VEGETABLE BASED SNACK STICK

(71) Applicant: Kellanova, Battle Creek, MI (US)

(72) Inventors: Md Monjur Hossen, Kalamazoo, MI (US); Amy Shouldice, Battle Creek, MI (US)

(73) Assignee: KELLANOVA, Battle Creek, MI (US)

( * ) Notice: Subject to any disclaimer, the term of this patent is extended or adjusted under 35 U.S.C. 154(b) by 862 days.

(21) Appl. No.: 17/435,190

(22) PCT Filed: Feb. 28, 2020

(86) PCT No.: PCT/US2020/020301
§ 371 (c)(1),
(2) Date: Aug. 31, 2021

(87) PCT Pub. No.: WO2020/180651
PCT Pub. Date: Sep. 10, 2020

(65) Prior Publication Data
US 2022/0142203 A1    May 12, 2022

Related U.S. Application Data

(60) Provisional application No. 62/812,466, filed on Mar. 1, 2019.

(51) Int. Cl.
*A23J 3/16*    (2006.01)
*A23J 3/22*    (2006.01)
(Continued)

(52) U.S. Cl.
CPC .................. *A23J 3/16* (2013.01); *A23J 3/227* (2013.01); *A23J 3/26* (2013.01); *A23L 29/238* (2016.08); *A23L 31/15* (2016.08)

(58) Field of Classification Search
CPC . A23L 29/238; A23L 31/15; A23J 3/26; A23J 3/14; A23J 3/227; A23J 3/16
See application file for complete search history.

(56) References Cited

U.S. PATENT DOCUMENTS

| | | |
|---|---|---|
| 4,250,198 A | 2/1981 | Millar et al. |
| 4,537,788 A | 8/1985 | Proctor et al. |
| (Continued) | | |

FOREIGN PATENT DOCUMENTS

| | | |
|---|---|---|
| EP | 0262276 A1 | 4/1988 |
| FR | 2487171 A1 * | 7/1980 |
| (Continued) | | |

OTHER PUBLICATIONS

PCTUS2020/020301 International Search Report dated Jun. 22, 2020.

*Primary Examiner* — Vera Stulii
(74) *Attorney, Agent, or Firm* — Honigman LLP

(57) ABSTRACT

A method for making an encased vegetable based jerky includes the steps of: hydrating a texturized vegetable protein mixture to form a fibrous mass; hydrating a gel forming vegetable protein isolate to form a protein gel; mixing the protein gel with the fibrous mass to form a mixed mass; extruding the mixed mass into a casing to form a cased mass; and cooking and drying the cased mass to form encased vegetable based jerky. The encased vegetable based jerky includes: a three-component protein mix including a textured long fiber vegetable protein, a textured short fiber vegetable protein, and a gel forming vegetable protein isolate, the three-component protein mix forming a plurality of protein clusters dispersed in the meat analogue; *psyllium* husk; and a casing enclosing the three-component vegetable protein mix wherein the casing is substantially free of breaks or delaminated portions, wherein the encased vegetable based jerky is substantially free of added vegetable oil.

9 Claims, 4 Drawing Sheets

(51) Int. Cl.
 *A23J 3/26* (2006.01)
 *A23L 29/238* (2016.01)
 *A23L 31/15* (2016.01)

(56) References Cited

U.S. PATENT DOCUMENTS

| | | |
|---|---|---|
| 9,314,045 B2 | 4/2016 | Nishimura et al. |
| 2009/0061051 A1 | 3/2009 | Visser |
| 2009/0208612 A1 | 8/2009 | Reiser et al. |
| 2009/0208633 A1 | 8/2009 | Kyed et al. |
| 2012/0207904 A1 | 8/2012 | Twombly et al. |
| 2013/0202777 A1 | 8/2013 | Davis |
| 2014/0010920 A1 | 1/2014 | Nishimura et al. |
| 2017/0105438 A1 | 4/2017 | Ajami et al. |
| 2018/0103664 A1 | 4/2018 | Ielsen |

FOREIGN PATENT DOCUMENTS

| | | |
|---|---|---|
| JP | 63-14663 A | 1/1988 |
| JP | 2018-075028 A | 5/2018 |
| WO | 2017-046659 A1 | 3/2017 |

\* cited by examiner

VEGETABLE BASED SNACK STICK

CROSS-REFERENCE TO RELATED APPLICATIONS

This application is a National Stage Application and claims priority under 35 U.S.C. § 371 to Patent Cooperation Treaty application PCT/US2020/020301, filed Feb. 28, 2020, which claims the benefit of and priority under 35 U.S.C. § 119 (e) to U.S. Provisional Application No. 62/812,466, filed Mar. 1, 2019. Priority is claimed to both of these applications and the disclosures of these prior applications are considered part of the disclosure of this application, and to the extent allowed, the entire contents of the aforementioned applications are incorporated herein.

TECHNICAL FIELD

This disclosure relates to compositions and a method of producing a vegetable base snack, and more particularly, to compositions and a method of producing an encased meat analogue resembling a piece of jerky.

BACKGROUND

Consumer interest in plant-based foods continues to gain interest as people attempt to choose snacks and meals that are healthier and better for both themselves and the environment. The shift to plant-based eating can present a big shift in lifestyle for consumers because of the potential difficulties in eliminating all animal-based products in their diet. These difficulties drive many consumers to simply reduce the animal-based products they eat to make room for more plant-based ones. These heavy users of plant based foods, commonly referred to as "flexitarians," are driving this shift to plant based foods. However, the challenge with this diet shift is that flexitarians are unwilling to sacrifice their eating experience when eating plant based foods. Consumers demand that these plant based foods are closely similar to their respective meat analogues in terms of taste, texture, and visual appearance. Although there are several plant based foods that are meat analogues available on the market, there are no known plant based snack sticks that are similar to meat jerky sticks in terms of visual appearance, taste, and texture. There is currently a technical gap in terms of the available methods and compositions currently used by food manufacturers and meeting consumer expectations with regards to taste, texture and characteristic bite when using and dealing with the organoleptic properties of plant materials when making meat analogues.

Accordingly, there is a need for both improved techniques and corresponding formulations that use vegetable based ingredients to produce meat-like products that have similar taste, texture, and appearance to their meat counterparts. The development of new methods and compositions that can provide better tasting and readily available vegetable based food products will give consumers more choices in managing their lifestyle and health.

SUMMARY

This section provides a general summary of the disclosure, and is not a comprehensive disclosure of its full scope or all of its features.

In one aspect, a method for making an encased vegetable based jerky is provided. In one approach, the method includes hydrating a texturized vegetable protein mixture to form a fibrous mass; hydrating a gel forming vegetable protein isolate to form a protein gel; mixing the protein gel with the fibrous mass to form a mixed mass; extruding the mixed mass into a casing to form a cased mass; and cooking and drying the cased mass to form encased vegetable based jerky.

In other approaches, the method of the previous paragraph may be combined with one or more optional features either individually or in any combination. These optional features include: wherein the texturized vegetable protein mixture includes a textured long fiber protein and a textured short fiber protein; and/or wherein the texturized vegetable protein mixture is hydrated with about 1 part of the textured vegetable protein mixture to about 1.5 to about 4 parts water; and/or wherein the gel forming vegetable protein isolate is hydrated with about 2 to about 5 parts of water per one part of the vegetable protein isolate; and/or wherein the textured long fiber protein is a textured long fiber soy protein having a fiber size of from about 2 mm to about 20 mm; and/or wherein the textured short fiber protein is a textured short fiber soy protein having a fiber size of from about 1 mm to about 10 mm; and/or further including adding to the fibrous mass one or more ingredients from the group consisting of glycerin, sugar, salt, seasoning, gum, vegetable juice, cultured dextrose, and mixtures thereof; and/or further including adding a food grade acid to the mixed mass; and/or wherein the encased vegetable based jerky has from about 0.01 wt % to about 1.0 wt % citric acid; and/or further including adding *psyllium* husk to the mixed mass; and/or wherein the encased vegetable based jerky has from about 0.01 wt % to about 1.0 wt % *psyllium* husk; and/or wherein the textured vegetable protein mixture includes from about 1.5 to 2.5 times more of the textured long fiber protein to the textured short fiber protein; and/or wherein a ratio of the textured vegetable protein mixture to the gel forming vegetable protein isolate is about 2.5:1 to about 1.75:1; and/or wherein the encased vegetable based jerky has from about 5 wt % to about 15 wt % textured long fiber protein; and/or wherein the encased vegetable based jerky has from about 5 wt % to about 15 wt % textured short fiber protein; and/or wherein the encased vegetable based jerky has from about 1 wt % to about 10 wt % gel forming vegetable protein isolate; and/or wherein the casing of the encased vegetable based jerky is added to the mixed mass substantially free of breaks or delaminated portions; and/or wherein the encased vegetable based jerky is substantially free of added vegetable oil; and/or wherein the casing is selected from the group consisting of gelatin, alginate, and combinations thereof.

In another aspect, an encased meat analogue is described herein that includes a three-component protein mix including a textured long fiber vegetable protein, a textured short fiber vegetable protein, and a gel forming vegetable protein isolate. In some approaches, the three-component protein mix forms a plurality of protein clusters dispersed in the meat analogue. The meat analogue may also include *psyllium* husk and a casing enclosing the three-component vegetable protein mix wherein the casing is substantially free of breaks or delaminated portions.

In other approaches, the meat analogue of the previous paragraph may be combined with one or more optional features either individually or in any combination. These optional features include: wherein the textured long fiber protein is a textured long fiber soy protein having a fiber size of from about 2 mm to about 20 mm; and/or wherein the textured short fiber protein is a textured short fiber soy protein having a fiber size of from about 1 mm to about 10 mm; and/or further including one or more ingredients selected from the group consisting of glycerin, sugar, salt, seasoning, gum, vegetable juice, cultured dextrose, and mixtures thereof; and/or further including a food grade acid; and/or wherein the meat analogue has from about 0.01 wt % to about 1.0 wt % citric acid; and/or wherein the meat analogue has from about 0.01 wt % to about 1.0 wt % *psyllium* husk; and/or wherein the three-component protein mix includes from about 1.5 to 2.5 times more of the textured long fiber protein to the textured short fiber protein; and/or wherein a ratio of the textured long fiber vegetable protein and textured short fiber vegetable protein to the gel forming vegetable protein isolate is about 2.5:1 to about 1.75:1; and/or wherein the encased meat analogue has from about 5 wt % to about 15 wt % textured long fiber protein; and/or wherein the encased meat analogue has from about 5 wt % to about 15 wt % textured short fiber protein; and/or wherein the encased meat analogue has from about 1 wt % to about 10 wt % gel forming vegetable protein isolate; and/or wherein the casing of the encased meat analogue is added to the three-component protein mix substantially free of breaks or delaminated portions; and/or wherein the encased meat analogue is substantially free of added vegetable oil; and/or wherein the casing is selected from the group consisting of gelatin, alginate, and combinations thereof; and/or wherein the encased meat analogue has a texture and moistness similar to a meat product.

In yet a further aspect, an encased vegetable based jerky composition is disclosed herein that includes a three-component protein mix comprising a textured long fiber vegetable protein, a textured short fiber vegetable protein, and a gel forming vegetable protein isolate, a combination of one or more of citric acid, yeast extract, and *psyllium* husk; and a casing enclosing the three-component protein mix wherein the casing is substantially free of breaks or delaminated portions, wherein the meat analogue is substantially free of added vegetable oil.

In other approaches, the meat analogue of the previous paragraph may be combined with one or more optional features either individually or in any combination. These optional features include: further including a plurality of protein clusters dispersed in the vegetable based jerky composition; and/or wherein the textured long fiber protein is a textured long fiber soy protein having a fiber size of from about 2 mm to about 20 mm; and/or wherein the textured short fiber protein is a textured short fiber soy protein having a fiber size of from about 1 mm to about 10 mm; and/or further including one or more ingredients selected from the group consisting of glycerin, sugar, salt, seasoning, gum, vegetable juice, cultured dextrose, and mixtures thereof; and/or wherein the textured vegetable protein mixture includes from about 1.5 to 2.5 times more of the textured long fiber protein to the textured short fiber protein; and/or wherein a ratio of the textured vegetable protein mixture to the gel forming vegetable protein isolate is about 2.5:1 to about 1.75:1; and/or wherein the encased vegetable based jerky has from about 5 wt % to about 15 wt % textured long fiber protein; and/or wherein the encased vegetable based jerky has from about 5 wt % to about 15 wt % textured short fiber protein; and/or wherein the encased vegetable based jerky has from about 1 wt % to about 10 wt % gel forming vegetable protein isolate; and/or wherein the laminated vegetable based jerky composition has a texture and moistness similar to a meat product.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

DETAILED DESCRIPTION

The substitution of meat proteins with vegetables and other non-meat proteins by consumers can be motivated by the consumer's decision to improve their health and wellness, in addition to being more sustainable for the environment. Consumer acceptance of meat-like products formulated from plant or vegetable based proteins is in a large part predicated on the appearance, texture, taste, and chewiness as compared to similar meat products. The duplication of these organoleptic properties to match those found in natural meat products is difficult both in terms of compositions and processing. The methods and compositions disclosed herein introduce vegetable based jerky sticks and/or vegetable based meat analogues that have a similar appearance to their traditional meat analogues in addition to similar taste and texture. The keys to solving the technical gaps in delivering a desirable consumer experience with respect to these organoleptic properties are addressed by the preparation methods and compositions disclosed herein.

Methods of Making an Encased Vegetable Based Jerky

The methods described herein include a method for making an encased vegetable based jerky including the steps of: hydrating a texturized vegetable protein mixture to form a fibrous mass; hydrating a gel forming vegetable protein isolate to form a protein gel; mixing the protein gel with the fibrous mass to form a mixed mass; extruding the mixed mass into a casing to form a cased mass; and cooking and drying the cased mass to form encased vegetable based jerky.

Figure 1:
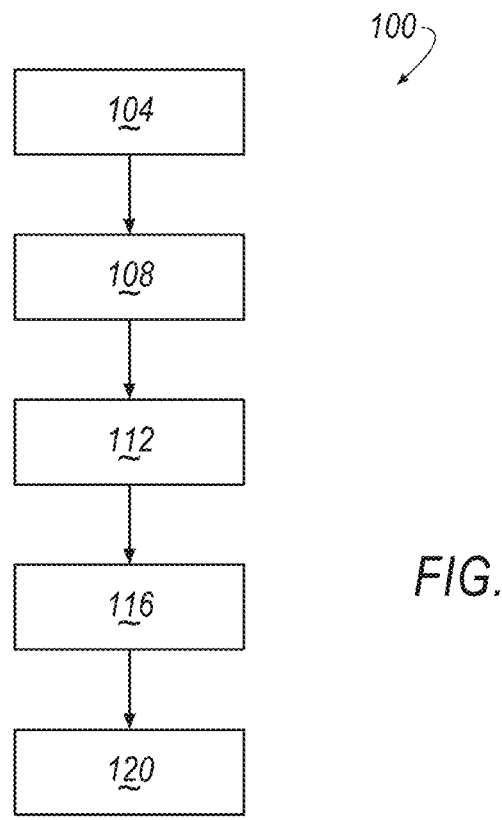
FIG. 1 is a flow diagram of an exemplary foodstuff manufacturing system used to perform a method for making an encased vegetable based meat analogue.

Referring to FIG. 1, a flow diagram of an exemplary foodstuff manufacturing system used to perform a method 100 for making an encased vegetable based meat analogue is provided. The method 100 may begin with a step 104 that includes hydrating a texturized vegetable protein to form a fibrous mass. The texturized vegetable protein mixture may include a textured long fiber protein and a textured short fiber protein. Each textured protein may be hydrated separately in step 104.

In one approach, the two textured proteins are hydrated separately with cold water or other fluid (in some approaches, water temperatures of about 30 to about 50° F.). In other approaches, hydration may occur with at least one part of the textured fiber protein to about 1.5 to about 4 parts water or other fluid, and in yet other approaches, about 1.5 to about 2 parts water, and in still other approaches about 2 parts water or other fluid. Hydration may occur with optional light blending of the textured proteins individually in their separate fluid containers via a suitable mixer, blender, or tumbler and allowing the proteins to hydrate for at least about 20 minutes, at least about 30 minutes, from about 20 to about 40 minutes, or from about 20 to about 30 minutes.

After hydration, the textured long fiber protein may be chopped, shredded, or high shear mixed such as through a shredding machine (such as a bowl chopper, grinder, shedder, mixer or other specifically designed shredder) for a short amount of time (e.g., about 15 to about 120 seconds, in other approaches about 60 to about 90 seconds). The short fiber textured proteins are preferably not chopped, sheared, or mixed and directly added to the final mixer 112 (below) after hydration without any further processing. The textured long fiber protein are added to the mixer 112 after the shredding.

Separately, a soy protein isolate is hydrated to form a gel in step 108. This separate gel hydrating step 108 helps create a gel matrix sufficient to hold and bind the fibrous materials together by mixing a high viscosity protein (such as soy protein or other vegetable protein), hydrocolloids (such as carrageenan or other gums) into water or other fluid using any type of high shear mixer to ensure proper mixing and hydration of the hydrocolloids so that substantially no fish eyes or lumps are formed and a smooth consistency is obtained. In one approach, a ratio of water-to-gel forming protein and hydrocolloids would be about 4:1 and ranges from about 5:1 to about 2:1. The water or other fluid used in this step could be room temperature (e.g., about 70 to about 75° F.).

The hydration and formation of the protein gel (step 108) and fibrous mass (step 104) are performed separately to help provide the desired texture in the final encased vegetable based jerky product. If the textured vegetable protein and the vegetable protein isolate are hydrated together then the desired textures and characteristics are not achieved.

All water used in the methods and desired formulation herein is preferably distributed into one of the above three steps i) hydration of the textured long fiber protein 104; ii) hydration of textured short fiber protein 104; and iii) hydration of the gel forming protein and hydrocolloids 108. All three hydration steps are carried out separately to achieve the desired finished product attributes. These three proteins have different water holding capacities and will compete among each other for water if they are hydrated together.

Next, step 112 is mixing the hydrated protein gel/hydrocolloid mix of step 108 with the hydrated fibrous mass (combined long and short textured proteins) of step 104 to form a combined mixed mass. The mixing of the fibrous mass and protein gel along with other optional ingredients (e.g., seasoning, flavors and coloring, and the like) can be carried out using, for instance, a typical double arm mixer without high shear to minimize further work and shear on fibrous mass and protein gel. The mixing 112 can be carried out at room temperature (about 70 to about 75° F.); however, colder temperature down to 50 or 60° F. can also be used. The mixing may be for a time effective to ensure proper mixing of the various components.

Figure 2:
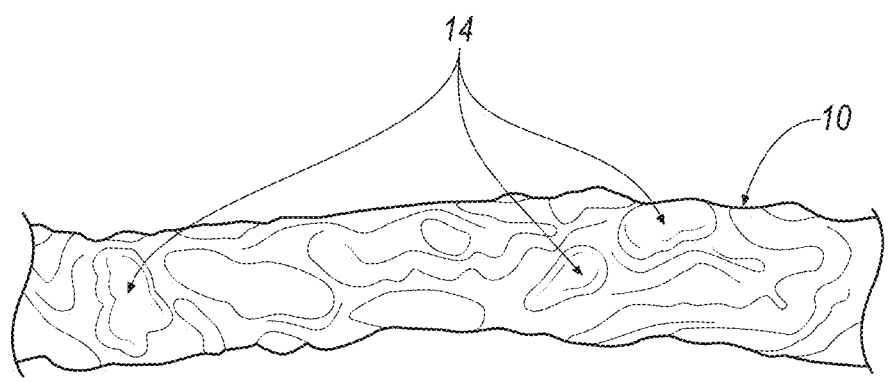
FIG. 2 is an illustration of a vegetable based snack stick illustrating protein clusters dispersed in the snack stick.
Figure 3:
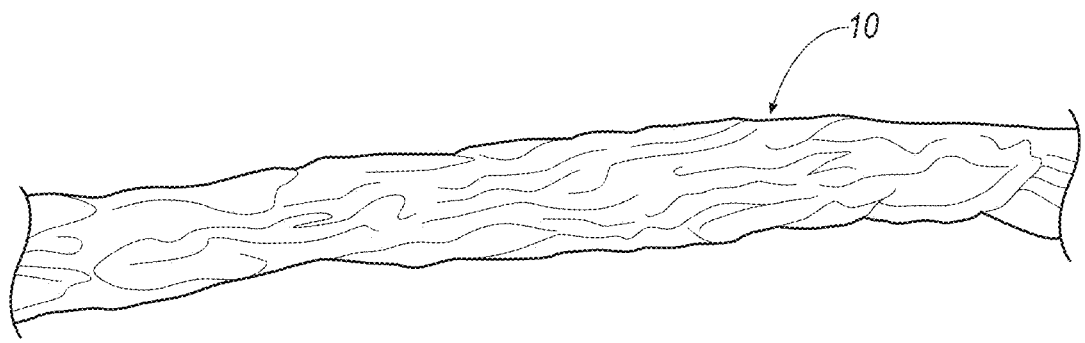
FIG. 3 is an illustration of a vegetable based snack stick enclosed in a casing substantially free of breaks or delaminated portions.
Figure 4:
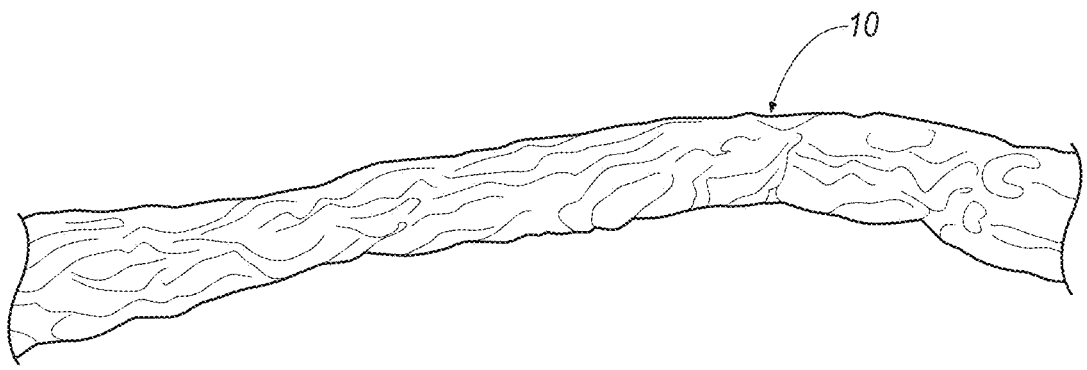
FIG. 4 is an illustration of a vegetable based snack stick enclosed in a casing substantially free of breaks or delaminated portions.
Figure 5:
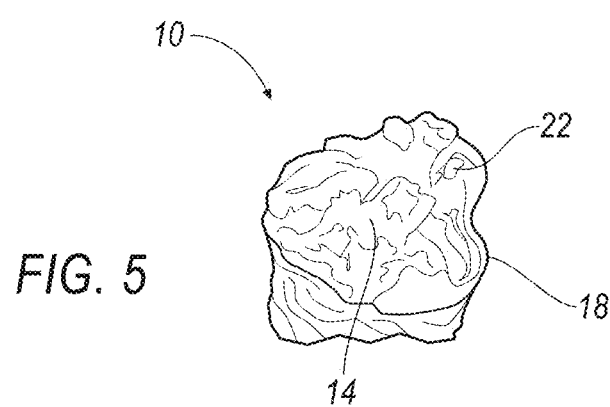
FIG. 5 is a cross-sectional illustration of a vegetable based snack stick.

As shown in FIG. 2, the mixed mass of the vegetable based snack stick 10 tends to form protein clusters 14. These protein clusters or blisters 14, typically appearing at the surface of the snack stick 10 product, may be the result of the rapid shredding of long fiber textured protein. While not wishing to be limited by theory, it is believed that the protein clusters 14 include the long and/or short textured protein fibers.

After mixing, the mixed mass is extruded 118 into a casing (such as an alginate casing) to form a cased mass. An exemplary extrusion may be a low shear cavity filled co-extrusion process where an alginate casing is being applied over the mass as it comes out of the extruder die. In some approaches, it has been discovered that the amount of alginate tends to have an effect on the final snap of the formed product, and in some approaches, between about 5 to about 10 percent alginate is preferred based on the fibrous and gelatinous mass that come out of the co-extrusion unit.

After extrusion, the extruded and encased mass is then cooked and dried at step 120 where the cased mass forms an encased vegetable based jerky or meat analogue. Cooking and drying may occur through a sausage link-type smoker where times, moistures, and temperatures can be varied through a number of different cycles. In some approach, the cooking and drying steps 120 aid, in combination with the selected ingredients, to achieve the organoleptic properties of a meat jerky, but obtained solely through vegetable-based ingredients. It was surprising that vegetable based ingredients could achieve organoleptic properties (such as, texture, snap, bite, overall flavor/taste) that mimics a traditional meat-containing jerky while still maintaining the shelf stability of the formed product.

In one example, a suitable cooking and drying protocol may include several different cooking cycles and drying cycles. For instance, Table 1 below provides an exemplary cook and dry protocol for step 120.

TABLE 1

Cooking and Drying Cycles

| Steps | Cycles | Duration (min) | Dry Bulb Temp (° F.) | Wet Bulb Temp (° F.) | Main Fan Speed | Exhaust Fan Speed |
|---|---|---|---|---|---|---|
| 1 | Cook | 20 to 40 | 130 to 160 | 0 to 10 | Low | Low |
| 2 | Cook | 60 to 90 | 170 to 190 | 160 to 170 | High | High |
| 3 | Cook | <5 | 170 to 180 | 160 to 170 | High | High |
| 4 | Drying | 500 to 800 | 100 to 150 | 0 to 10 | Medium | Medium |
| 5 | Cooling | 100 to 200 | 50 to 70 | 40 to 50 | High | off |

Encased Vegetable Based Jerky Compositions

The methods described herein include the production of an encased vegetable based jerky or meat analogue. In one approach, this vegetable based jerky includes at least a select three-component protein mix including the textured long fiber vegetable protein, the textured short fiber vegetable protein, and the gel forming vegetable protein isolate. In some approaches, the select textured vegetable proteins form agglomerates or protein clusters dispersed throughout the formed jerky and at least at the surface thereof.

In addition to the select protein combination, the product may also include one or more of a food grade acid (such as citric acid, sorbic acid, and the like); *psyllium* husk; yeast extract; and a casing (such as an alginate case) enclosing the three-component protein mix and other mixed ingredients and wherein the casing can be substantially free of breaks or delaminated portions. In some approaches, the encased vegetable based jerky is substantially free of added vegetable oil, which was found detrimental to product quality and integrity of the encased product. As used herein, substantially free of with respect to an ingredient, such as vegetable oil, generally means less than about 1 percent, less than about 0.5 percent, less than about 0.1 percent, and in other approaches none. In the context of breaks or delamination, "substantially free of" generally means there are no areas or portions of visible breaks or delamination of the casing from the internal three-component protein mixture.

The three-component protein mix includes at least the textured long fiber protein, the textured short fiber protein, and the gel forming vegetable protein isolate. In some aspects, the textured long fiber protein may include a textured long fiber soy protein or a soy chunk having a fiber size of from about 2 mm to about 20 mm. In some aspects, the textured short fiber protein is a textured short fiber soy protein or soy granule having a fiber size of from about 1 mm to about 10 mm. While soy proteins are used for the textured proteins, other textured vegetable fiber proteins are also suitable as needed for a particular application. The gel forming protein is a protein isolate having greater than about 80 weight percent protein content.

In some approaches, the encased vegetable based jerky compositions include about 4 to about 25 weight percent, about 4 to about 20 weight percent, about 10 to about 20 weight percent, or about 14 to about 18 weight percent of the textured proteins (both the long and short fiber protein) and about 4 to about 16 weight percent, about 4 to about 12 weight percent, about 4 to about 8 weight percent, or about 4 to about 6 weight percent of the gel forming vegetable protein isolate. In other approaches, the composition includes about 8 to about 16 weight percent, about 8 to about 12 weight percent, or about 10 to about 12 weight percent of the long fiber textured proteins and about 4 to about 8 weight percent, about 5 to about 7 weight percent, or about 5 to about 6 weight percent of the short fiber textured proteins.

In some aspects, the three-component protein mix includes from about 1.5 to about 2.5 times more, from about 1.5 to about 2.0 times more, or from about 2.0 to about 2.5 times more of the textured long fiber protein to the textured short fiber protein. In other aspects, the three-component protein mix includes about 1.5, about 1.6, about 1.7, about 1.8, about 1.9, about 2.0, about 2.1, about 2.2, about 2.3, about 2.4, or about 2.5 times more of the textured long fiber protein to the textured short fiber protein. In other aspects, the ratio of the combined or mixed textured long fiber protein and textured short fiber protein, referred to as the "texturized vegetable protein mixture", to the gel forming vegetable protein isolate is about 2.5:1 to about 1.75:1. In some aspects, the ratio of the combined or mixed textured long fiber protein and textured short fiber protein to the gel forming vegetable protein isolate is about 2.5:1, about 2.4:1, about 2.3:1, about 2.2:1, about 2.1:1, about 2.0:1, about 1.9:1, about 1.8:1, or about 1.75:1.

Referring to FIG. 2, an illustration of the vegetable based snack stick 10 illustrating protein clusters 14 dispersed in the snack stick 10 is provided. In some approaches, these protein clusters 14 are believed to be a portion of the long fiber textured protein pieces which did not fully hydrate and did not get fully shredded. In other approaches, these protein clusters 14 may also include some short fiber textured protein pieces as well.

In some aspects, one or more additional ingredients may be added to the encased vegetable based jerky including glycerin, seasoning, gums vegetable juice (such as beet juice for color), cultured dextrose, and mixtures thereof. Exemplary gums include carrageenan, cellulose gel and cellulose gum, guar gum, gum Arabic, tamarind turn, and modified starch such as cooked grains. Other possible ingredients include fruit juice, fruit concentrate, and fruit powders.

In some aspects, the encased vegetable based jerky or meat analogue may include from about 0.01 wt % to about 1.0 wt % food grade acids, such as sorbic acid, citric acid, and the like. It is believed that the acid tends to mitigate aftertaste from glycerin.

In some aspects, the encased vegetable based jerky or meat analogue may include from about 0.01 wt % to about 1.0 wt % *psyllium* husk. *Psyllium* husk has very high water absorption capacity and can retain moisture at much lower level than other gums or starches. The *psyllium* husk can be used intact or be ground to a smaller particle size.

In some aspects, the encased vegetable based jerky or meat analogue may include from about 0.01 wt % to about 5.0 wt % yeast extract, from about 0.01 wt % to about 3.0 wt % yeast extract, from about 0.10 wt % to about 2.0 wt % yeast extract, from about 0.10 wt % to about 1.0 wt % yeast extract, from about 1.0 wt % to about 2.0 wt % yeast extract, about 0.5 wt % yeast extract, about 1.0 wt % yeast extract, about 1.5 wt % yeast extract, about 2.0 wt % yeast extract, about 2.5 wt % yeast extract, about 3.0 wt % yeast extract, about 3.5 wt % yeast extract, about 4.0 wt % yeast extract, about 4.5 wt % yeast extract, or about 5.0 wt % yeast extract.

Figure 6:
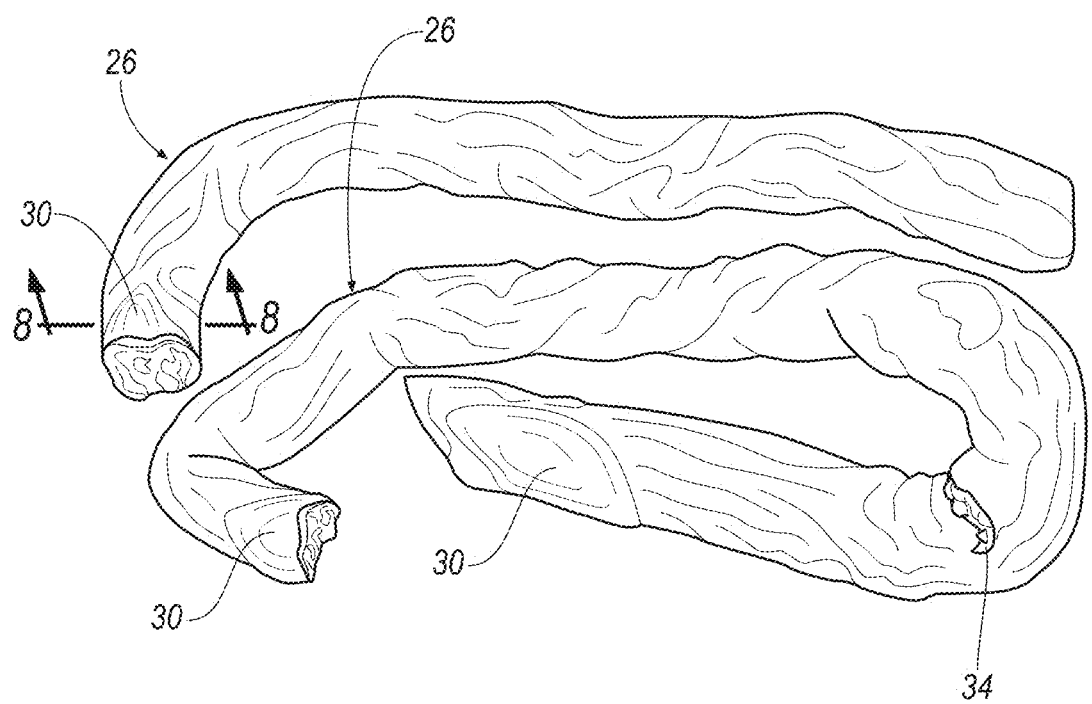
FIG. 6 is an illustration of a vegetable based snack stick enclosed in a casing having one or more portions where the casing is broken or delaminated.
Figure 7:
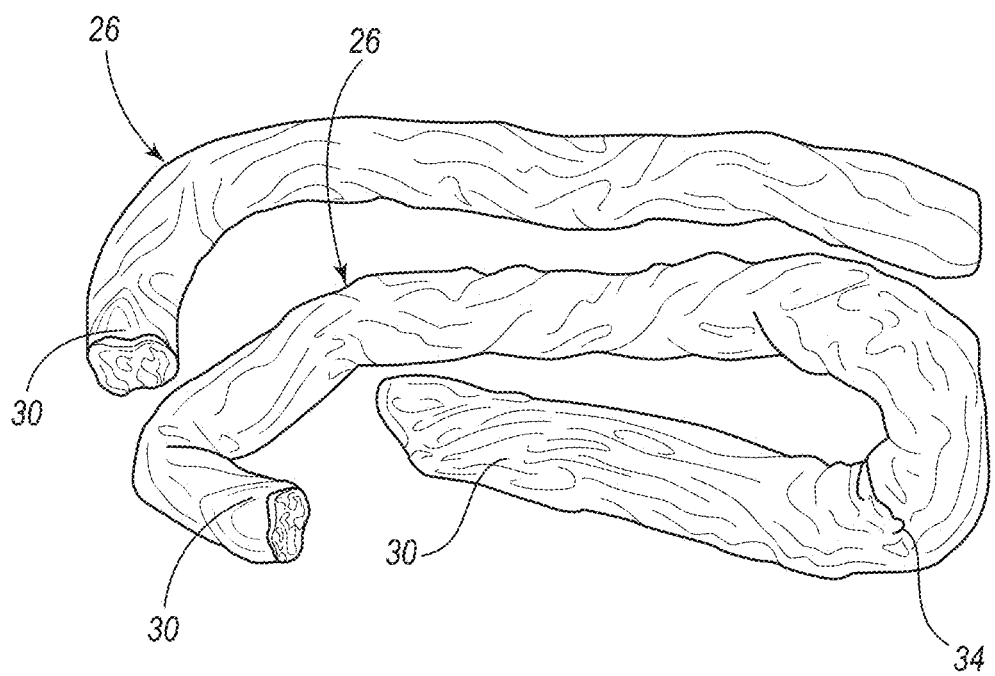
FIG. 7 is a photo of a vegetable based snack stick enclosed in a casing having one or more portions where the casing is broken or delaminated.
Figure 8:
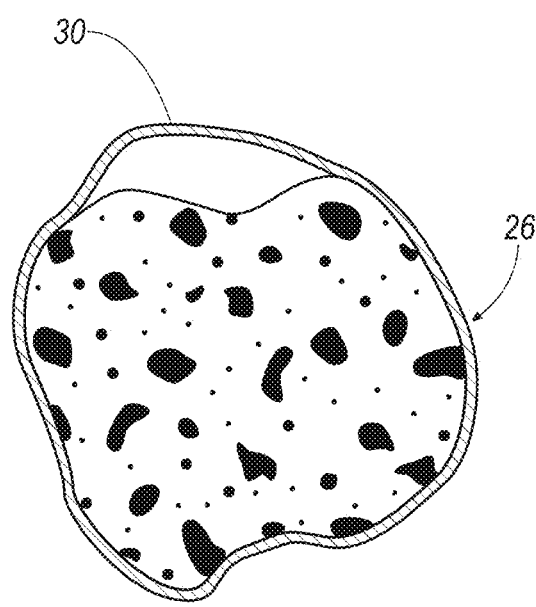
FIG. 8 is a cross-sectional illustration of the vegetable based snack stick of FIG. 6 along line 8-8.

Referring to FIGS. 3-8, illustrations and a photo image of vegetable based snack sticks 10 having a casing 18 enclosing the three component protein mix 22, including protein clusters 14, are provided where the casing 18 is substantially free of delaminated portions 30 or breaks 34. Examples 1 to 4 below provide comparative compositions that failed to properly enclose the three-component protein mix 22. Comparing Examples 1 to 4 with Inventive Examples 5 to 8 demonstrate that the addition of vegetable oil, an ingredient typically used to improve moisture in prior products, leads to delaminated portions 30 and breaks 34 in the vegetable based jerky or snack sticks 10. In some aspects, the vegetable based jerky or snack sticks 10 are substantially free of added vegetable oil to help prevent breaks 34 and/or delaminated portions 30. Referring now to FIG. 6, FIG. 7, and FIG. 8, illustrations and a photo image of a comparative example vegetable based snack stick 26 enclosed in a casing having one or more portions where the casing is broken 34 or delaminated 30. The photograph depicted in FIG. 7 and illustrations of FIG. 6 and FIG. 8 are representative of the vegetable based snack sticks 26 produced in Examples 1-4 where the casing was delaminated 30 and/or broken 34.

In some aspects, the casing is selected from the group consisting of gelatin, alginate, and combinations thereof.

The encased vegetable based jerky or snack sticks has a texture and moistness similar to a meat product. In some approaches, the encased vegetable based jerky has about 30 to about 35 percent moisture.

EXAMPLES

The following examples are illustrative, but are not meant to be limiting, of the methods and compositions of the present disclosure. Other suitable modifications and adaptations of the variety of conditions and parameters normally encountered in the field, and which are obvious to those skilled in the art, are within the spirit and scope of the disclosure. Formulas 1 to 8 shown in Tables 1 and 2 below exemplify different vegetable based compositions and the corresponding observations regarding taste, texture, and appearance. Unless specified otherwise in this disclosure, any percentages, ratios, or amounts are by weight Comparative Example Formula 1

The vegetable based snack stick made from this composition had a soft texture with a sweet aftertaste triggered by the glycerin additive. This snack stick did not have a similar taste, texture, or look as a comparative meat based jerky product. In addition, the casing was observed to peel away or delaminate from the mixed mass or three-component protein mix. See Table 1 below for the complete formulation.

Comparative Example Formula 2

Although the composition used to form this vegetable based snack stick contained different respective vegetable protein ratios and less vegetable protein overall added to the composition, this snack stick had a soft texture with a sweet aftertaste triggered by the glycerin additive similar to Comparative Example Formula 1. This snack stick did not have a similar taste, texture, or look as a comparative meat based jerky product. In addition, the casing was observed to peel away or delaminate from the mixed mass. See Table 1 below for the complete formulation.

Comparative Example Formula 3

The composition used to form this vegetable based snack stick contained even less overall vegetable protein added to the composition leaving this snack stick with a texture even softer than what was observed in Comparative Example Formulas 1 and 2. The Comparative Formula 3 snack stick also had a sweet aftertaste caused by the glycerin additive. This snack stick did not have a similar taste, texture, or look to a comparative meat based jerky product. In addition, and like Comparative Example Formulas 1 and 2, the casing was observed to peel away or delaminate from the mixed mass. See Table 1 below for the complete formulation.

Comparative Example Formula 4

The snack stick formed using Comparative Example Formula 4 provided an acceptable texture as compared to an analogous meat based jerky product. However, Similar to Comparative Example Formulas 1-3, the casing still was observed to peel away or delaminate from the surface of the snack stick forming visually unappealing areas. This snack stick also had a noticeable sweet glycerin aftertaste as similarly detected in Comparative Example Formulas 1-3. See Table 1 below for the complete formulation.

Example Formula 5

The Inventive Example Formula 5 eliminated all vegetable oil from the formulation and added citric acid. The resulting snack stick had an ideal texture upon chewing and the taste and mouth feel was comparable to an analogous meat based jerky product. The casing remained coupled and in close contact with the mixed mass, which provided a desirable appearance like a comparative beef jerky product. The snack stick did have a slightly dry (less moist) consistency leading to a somewhat dry eating experience. See Table 2 below for the complete formulation.

Example Formula 6

The snack stick formed using Inventive Example Formula 6 provided a texture and taste, surprisingly similar to an analogous meat based jerky product. In addition, the casing remained coupled and in close contact with the mixed mass or three-component protein mix of Formula 6, providing a desirable appearance like a comparative beef jerky product having substantially no delamination and breaks in the casing. The Inventive Formula 6 composition was substantially free of vegetable oil and additionally contained *psyllium* husk that was used to prevent the slightly dry consistency observed in Formula 5. See Table 2 below for the complete formulation.

Example Formula 7

The snack stick formed using Inventive Example Formula 7 provided a texture and taste, surprisingly similar to an analogous meat based jerky product. In addition, the casing remained coupled and in close contact with the mixed mass or three-component protein mix of Formula 7, providing a desirable appearance like a comparative beef jerky product having substantially no delamination and breaks in the casing. The Inventive Formula 7 composition was substantially free of vegetable oil and additionally contained yeast extract. See Table 2 below for the complete formulation.

Example Formula 8

The snack stick formed using Inventive Example Formula 8 provided a texture and taste, surprisingly similar to an analogous meat based jerky product. In addition, the casing remained coupled and in close contact with the mixed mass or three-component protein mix of Formula 8, providing a desirable appearance like a comparative beef jerky product having substantially no delamination and breaks in the casing. The Inventive Formula 8 composition was substantially free of vegetable oil and additionally contained yeast extract. See Table 2 below for the complete formulation.

TABLE 1

| | Formula 1 Weight % | Formula 2 Weight % | Formula 3 Weight % | Formula 4 Weight % |
| --- | --- | --- | --- | --- |
| Water | 51.85 | 57.65 | 59.85 | 62.96 |
| Textured Soy Protein Long Fiber | 15 | 10.1 | 2.7 | 11.12 |
| Textured Soy Protein Short Fiber | 8 | 5.4 | 1.7 | 4.77 |
| Gel Forming Soy Protein Isolate | 5 | 6.7 | 15.6 | 7 |
| Vegetable Oil | 8 | 8 | 8 | 2 |
| Vegetable Glycerin | 5 | 5 | 5 | 5 |
| Cultured Dextrose | 1.5 | 1.5 | 1.5 | 1.5 |

TABLE 1-continued

|  | Formula 1 Weight % | Formula 2 Weight % | Formula 3 Weight % | Formula 4 Weight % |
|---|---|---|---|---|
| Carrageenan | 0.5 | 0.5 | 0.5 | 0.5 |
| Vegetable Juice and/or Coloring | 0.8 | 0.8 | 0.8 | 0.8 |
| Natural Flavor | 0.3 | 0.3 | 0.3 | 0.3 |
| Seasoning | 4.1 | 4.1 | 4.1 | 4.1 |
| Psyllium Husk | — | — | — | — |
| Citric Acid | — | — | — | — |
| Total | 100 | 100 | 100 | 100 |

TABLE 2

|  | Formula 5 Weight % | Formula 6 Weight % | Formula 7 Weight % | Formula 8 Weight % |
|---|---|---|---|---|
| Water | 64.61 | 64.36 | 60.01 | 62.31 |
| Textured Soy Protein Long Fiber | 10.5 | 10.5 | 10.49 | 10.88 |
| Textured Soy Protein Short Fiber | 5.6 | 5.6 | 5.80 | 6.01 |
| Gel Forming Soy Protein Isolate | 7 | 7 | 5.74 | 5.96 |
| Vegetable Oil | 0 | 0 | 0 | 0 |
| Vegetable Glycerin | 5 | 5 | 4.36 | 4.52 |
| Cultured Dextrose | 1.5 | 1.5 | 1.39 | 1.44 |
| Carrageenan | 0.5 | 0.5 | 0.48 | 0.49 |
| Vegetable Juice and/or Coloring | 0.8 | 0.8 | 0.79 | 0.83 |
| Natural Flavor | 0.4 | 0.4 | 1.27 | 0.82 |
| Seasoning | 4.1 | 4.1 | 8.20 | 5.22 |
| Psyllium Husk | 0 | 0.25 | 0 | 0 |
| Citric Acid | 0.04 | 0.04 | 0.02 | 0.02 |
| Yeast Extract | 0 | 0 | 1.45 | 1.50 |
| Total | 100 | 100 | 100 | 100 |

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for making an encased vegetable based jerky comprising the steps of:
    hydrating a textured long fiber vegetable protein;
    hydrating a textured short fiber vegetable protein;
    wherein the textured long fiber vegetable protein and the textured short fiber vegetable protein are hydrated with about 1 part of the vegetable protein to about 1.5 to about 4 parts water, wherein the water is 30° F. to 50° F., and wherein the water is mixed for about 20 to about 40 minutes;
    chopping, shredding, or shearing the textured long fiber vegetable protein, and wherein the textured short fiber vegetable textured proteins are not chopped, shredded, or sheared;
    mixing the textured short fiber vegetable protein and the chopped, shredded, or sheared textured long fiber vegetable protein to form a fibrous mass;
    hydrating a gel forming vegetable protein isolate to form a protein gel;
    mixing the protein gel with the fibrous mass to form a mixed mass, wherein the mixed mass forms a plurality of protein clusters dispersed in the vegetable based jerky;
    extruding the mixed mass into an alginate casing to form a cased mass;
    cooking and drying the cased mass to form encased vegetable based jerky; and
    wherein the encased vegetable based jerky has about 5% to about 10% alginate.

2. The method of claim 1, wherein the gel forming vegetable protein isolate is hydrated with about 2 to about 5 parts of water per one part of the vegetable protein isolate.

3. The method of claim 1, wherein the textured long fiber protein is a textured long fiber soy protein having a fiber size of from about 2 mm to about 20 mm and wherein the textured short fiber protein is a textured short fiber soy protein having a fiber size of from about 1 mm to about 10 mm.

4. The method of claim 1, further including adding a food grade acid to the mixed mass and wherein the encased vegetable based jerky has from about 0.01 wt % to about 1.0 wt % citric acid.

5. A method for making an encased vegetable based jerky comprising the steps of:
    hydrating a textured long fiber vegetable protein;
    hydrating a textured short fiber vegetable protein;

wherein the textured long fiber vegetable protein and the textured short fiber vegetable protein are hydrated with about 1 part of the vegetable protein to about 1.5 to about 4 parts water, wherein the water is 30° F. to 50° F., and wherein the water is mixed for about 20 to about 40 minutes;

chopping, shredding, or shearing the textured long fiber vegetable protein, and wherein the textured short fiber vegetable textured proteins are not chopped, shredded, or sheared;

mixing the textured short fiber vegetable protein and the chopped, shredded, or sheared textured long fiber vegetable protein to form a fibrous mass;

hydrating a gel forming vegetable protein isolate to form a protein gel;

mixing the protein gel with the fibrous mass to form a mixed mass, wherein the mixed mass forms a plurality of protein clusters dispersed in the vegetable based jerky;

extruding the mixed mass into a casing to form a cased mass;

cooking and drying the cased mass to form encased vegetable based jerky; and further including adding *psyllium* husk to the mixed mass and wherein the encased vegetable based jerky has from about 0.01 wt % to about 1.0 wt % *psyllium* husk.

6. The method of claim 1, wherein the textured vegetable protein mixture includes from about 1.5 to 2.5 times more of the textured long fiber protein to the textured short fiber protein.

7. The method of claim 1, wherein a ratio of the textured vegetable protein mixture to the gel forming vegetable protein isolate is about 2.5:1 to about 1.75:1.

8. The method of claim 1, wherein the encased vegetable based jerky has from about 5 wt % to about 15 wt % textured long fiber protein, about 5 wt % to about 15 wt % textured short fiber protein, and about 1 wt % to about 10 wt % gel forming vegetable protein isolate.

9. The method of claim 1, wherein the encased vegetable based jerky is substantially free of added vegetable oil.

\* \* \* \* \*